US008632232B2

(12) United States Patent
Okui et al.

(10) Patent No.: US 8,632,232 B2

(45) Date of Patent: *Jan. 21, 2014

(54) VEHICULAR HEADLAMP HAVING A COLUMNAR LIGHT GUIDE

(75) Inventors: Kazuki Okui, Shizuoka (JP); Akio Inoue, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 98 days.

This patent is subject to a terminal disclaimer.

(21) Appl. No.: 13/075,771

(22) Filed: Mar. 30, 2011

(65) Prior Publication Data

US 2011/0242830 A1 Oct. 6, 2011

(30) Foreign Application Priority Data

Mar. 31, 2010 (JP) ................................ 2010-824499

(51) Int. Cl.

*B60Q 1/00* (2006.01)
*F21V 9/00* (2006.01)
*F21V 11/00* (2006.01)

(52) U.S. Cl.

USPC ........... 362/511; 362/459; 362/509; 362/464; 362/510; 362/512

(58) Field of Classification Search

None

See application file for complete search history.

(56) References Cited

U.S. PATENT DOCUMENTS

| | | | | |
|---|---|---|---|---|
| 5,416,669 | A * | 5/1995 | Kato et al. | 362/551 |
| 5,432,876 | A * | 7/1995 | Appeldorn et al. | 385/31 |
| 6,418,253 | B2 * | 7/2002 | Whitehead | 385/31 |
| 6,635,841 | B2 * | 10/2003 | Makino | 218/134 |
| 7,695,175 | B2 * | 4/2010 | Futami | 362/511 |
| 2001/0038736 | A1 | 11/2001 | Whitehead | |
| 2005/0057938 | A1 * | 3/2005 | Mertens et al. | 362/487 |
| 2005/0189545 | A1 * | 9/2005 | Tazawa et al. | 257/79 |
| 2011/0242831 | A1 * | 10/2011 | Okui et al. | 362/511 |
| 2011/1242831 | * | 10/2011 | Ouki et al. | 362/511 |

FOREIGN PATENT DOCUMENTS

| | | | |
|---|---|---|---|
| DE | 10332393 | A1 | 2/2005 |
| EP | 1970616 | A1 | 9/2008 |
| JP | 1211705 | A | 8/1989 |
| JP | 2002-367404 | A | 12/2002 |

OTHER PUBLICATIONS

Extended European Search Report Issued in European Application No. 11159416.4, Dated Jul. 27, 2012 (7 Pages).

* cited by examiner

*Primary Examiner* — Natalie Walford

(74) *Attorney, Agent, or Firm* — Osha Liang LLP

(57) ABSTRACT

A vehicle lamp includes, within a lamp chamber formed by a lamp body and a front cover, a light source, a columnar light guide having an incident portion at the end thereof in the vicinity of the light source, and an annular reflecting portion arranged in the vicinity of the light source side of the incident portion. The columnar light guide guides incident light from the light source, which enters via the incident portion, and irradiates the incident light from a light-emitting portion on a front side. The annular reflecting portion reflects light with a large emission angle, which has not been able to directly enter the incident portion from the light source, toward the incident portion. The light source is arranged on a central axis of the annular reflecting portion.

18 Claims, 6 Drawing Sheets

VEHICULAR HEADLAMP HAVING A COLUMNAR LIGHT GUIDE

CROSS-REFERENCE TO RELATED APPLICATION

This application claims the benefit of priority of Japanese Application No. 2010-82499, filed on Mar. 31, 2010, the disclosure of which is incorporated herein by reference.

TECHNICAL FIELD

The present invention relates to a vehicle lamp for an automobile or the like, and particularly, to a vehicle lamp which makes the light of an LED light source enter a light guide arranged in the vicinity thereof, and emits the light toward an irradiation direction from the light guide.

BACKGROUND

Conventionally, there is known a vehicle lamp which forms a predetermined light distribution by a columnar light guide arranged along a front cover and a LED light source arranged in the vicinity of the light guide, within a lamp chamber defined by a lamp body and the front cover (for example, Patent Document 1).

Usually, the light guide is arranged so as to slant as it extends laterally or upward from the central side of a vehicle body along the shape of the vehicle body along with a front cover, and includes a reflecting surface having a diffusing step on a rear surface side. Also, the incident light from the LED light source is reflected by the diffusing step, and is emitted in an irradiation direction from a light-emitting surface on the front surface side.

[Patent Document 1] JP-A-2002-367404

SUMMARY OF THE INVENTION

However, in the above-described conventional vehicle lamp, the light with a large emission angle of the emitted light from the LED light source cannot be made to enter the light guide, and it is difficult to enhance the light use efficiency of the LED light source.

One or more embodiments of the present invention provide a vehicle lamp capable of making the light from a light source reliably enter a light guide, thereby improving the light use efficiency of a light source.

A vehicle lamp, according to an exemplary embodiment of the invention, comprises: within a lamp chamber formed by a lamp body and a front cover, a light source;

a columnar light guide having an incident portion at the end thereof in the vicinity of the light source, wherein the columnar light guide guides incident light from the light source, which enters via the incident portion, and irradiates the incident light from a light-emitting portion on a front side; and an annular reflecting portion arranged in the vicinity of the light source side of the incident portion, wherein the annular reflecting portion reflects the light with a large emission angle, which has not been able to directly enter the incident portion from the light source, toward the incident portion, wherein the light source is arranged on a central axis of the annular reflecting portion.

According to the vehicle lamp of the above configuration, there is included an annular reflecting portion arranged in the vicinity of the light source side of the incident portion. The annular reflecting portion reflects light with a large emission angle, which has not been able to directly enter the incident portion from the light source, toward the incident portion. Thus, the light with a large emission angle from the light source can be reflected by the annular reflecting portion, and can be made to enter the light guide from the incident portion. This can improve the light use efficiency of the light source.

In the vehicle lamp, in one or more embodiments, the annular reflecting portion is formed on a peripheral surface of a through hole formed in a plate-shaped member, and a plurality of attachment ribs, which fix the columnar light guide, are integrally formed along the central axis of the annular reflecting portion, around the through hole on the columnar light guide side of the plate-shaped member.

According to the vehicle lamp of such a configuration, because the columnar light guide is positioned at a predetermined position of the plate-shaped member having the annular reflecting portion, the positional precision of the incident portion of the columnar light guide can be improved.

In the vehicle lamp, in one or more embodiments, the annular reflecting portion includes a columnar curved surface or a slope which forms a substantially truncated conical space whose diameter increases toward the columnar light guide from the light source, and the columnar light guide is formed so that the shape of the incident portion in front view as seen from a position where the light source is arranged is circular, and the external diameter decreases gradually toward an extension direction from the incident portion.

According to the vehicle lamp of such a configuration, because the external diameter of the incident portion of the end of the light guide can be made large and the incidence area of the light guide can be made large, the light use efficiency of the light source can be further improved.

In the vehicle lamp, in one or more embodiments, the light source and the annular reflecting portion are fixed to a heat-radiating member attached to the lamp body.

According to the vehicle lamp of such a configuration, because the light source and the annular reflecting portion are fixed to a heat-radiating member arranged in the vicinity of the light source, the positional precision of the light source can be improved.

According to the vehicle lamp according to one or more embodiments of the invention, there is included an annular reflecting portion for reflecting light with a large emission angle, which has not been able to directly enter the incident portion from the light source, toward the incident portion. Thus, the light with a large emission angle from the light source can be reflected by the annular reflecting portion, and can be made to enter the light guide from the incident portion. This can improve the light use efficiency of the light source.

DETAILED DESCRIPTION

Hereinafter, embodiments of a vehicle lamp according to the present invention will be described with reference to FIGS. 1 to 6.

Figure 1:
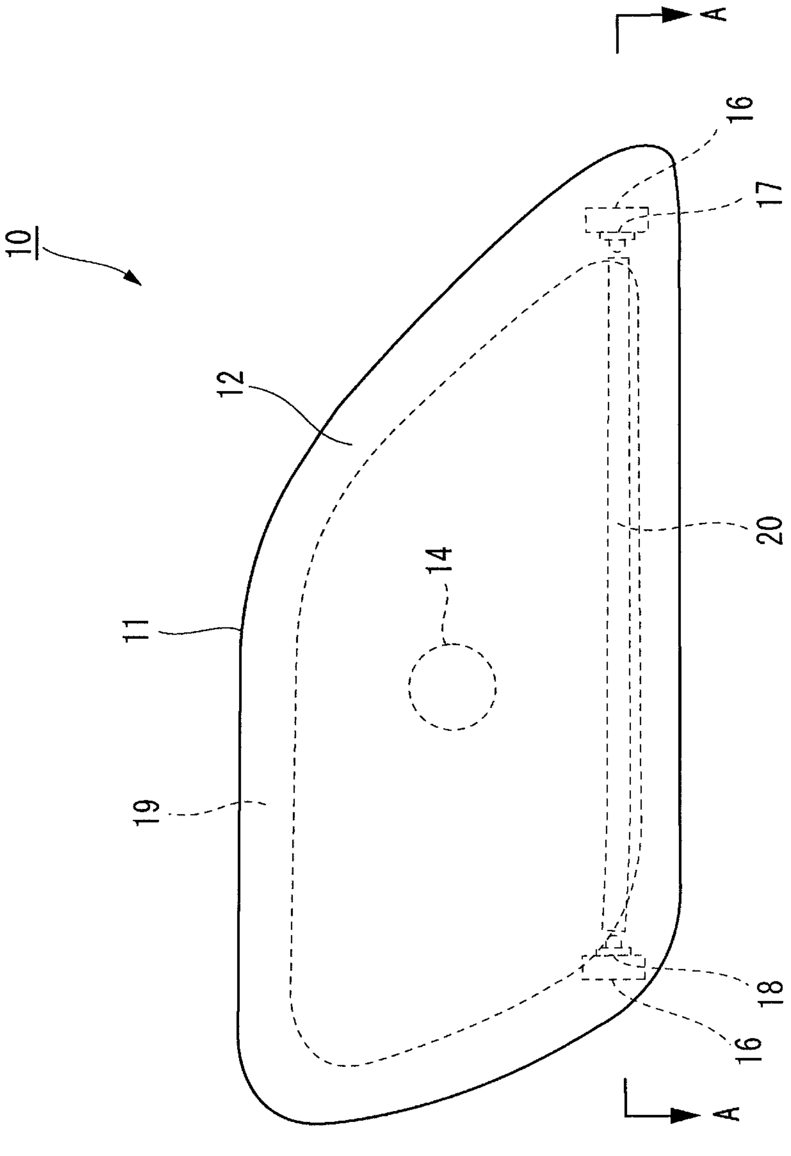
FIG. 1 is a front view showing a first embodiment of a vehicle lamp according to an embodiment of the invention.
Figure 2:
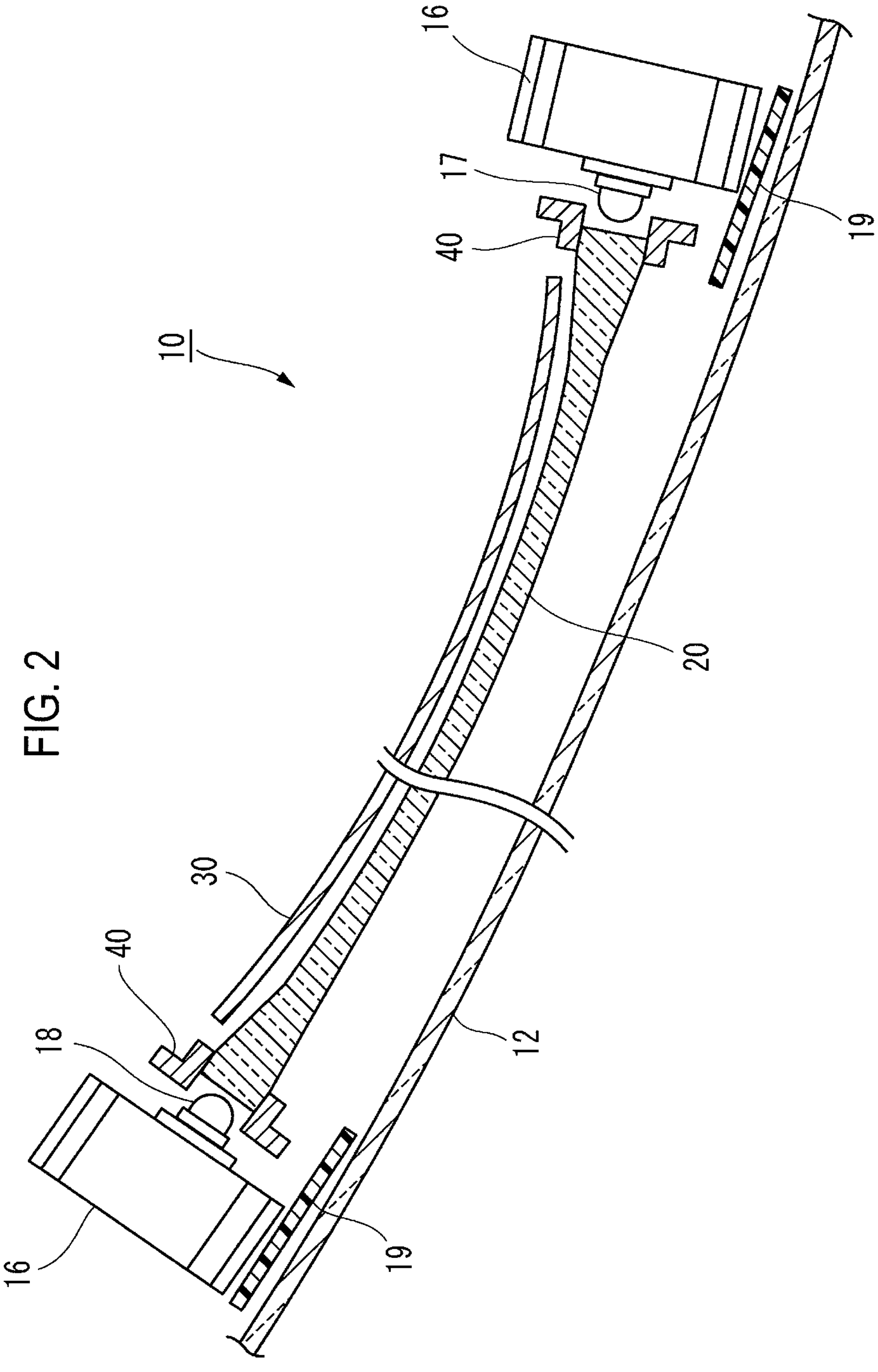
FIG. 2 is a sectional view along A-A line of FIG. 1.

As shown in FIGS. 1 and 2, a vehicle lamp 10 which is an embodiment applied to a pilot lamp of a headlamp including a lamp body 11 made of resin which is fixed to the vehicle body side in a shape whose vehicle front side is opened, and a colorless transparent front cover 12 which is attached to an opening portion of the lamp body 11.

The vehicle lamp 10 has a bulb 14 arranged for the headlamp 14 at a central portion within a lamp chamber which is defined by the lamp body 11 and the front cover 12. The front cover 12 is arranged so as to slant from the front on the central side of a vehicle body toward the rear on the lateral side of the vehicle body, and a light guide 20 which is a columnar light guide which is curved along the front cover 12 is arranged. Additionally, a reflecting member 30, which is curved so as to maintain a predetermined spacing from the light guide 20, is arranged in the vicinity of the rear face side of the light guide 20.

Heat-radiating members (heat sinks) 16 are attached to the vicinities of both ends of the light guide 20, and LED light sources 17 and 18 and the ends of the light guide 20 are fixed to lateral portions of the heat-radiating members 16 via plate-shaped members 40 which will be described below. For example, position lamp light distribution is formed by the LED light source 17 and the light guide 20. Additionally, an extension 19 is arranged around the opening portion of the lamp body 11.

Figure 3:
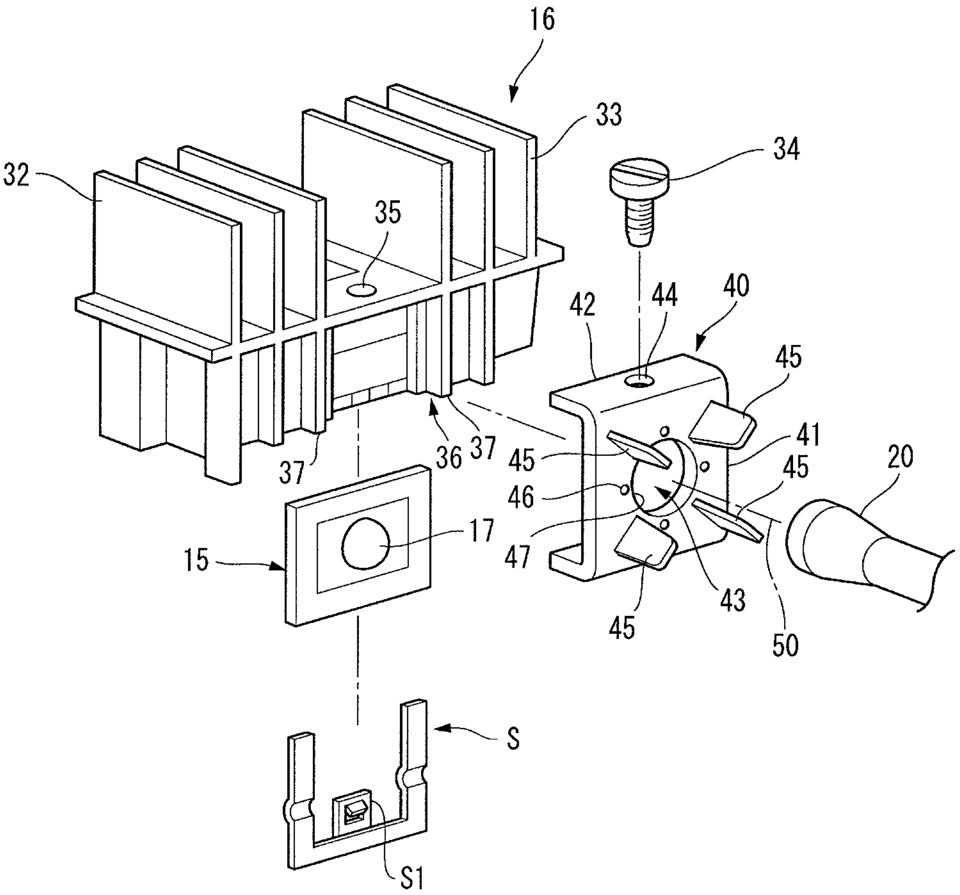
FIG. 3 is an exploded perspective view showing a main part of FIG. 1.
Figure 4:
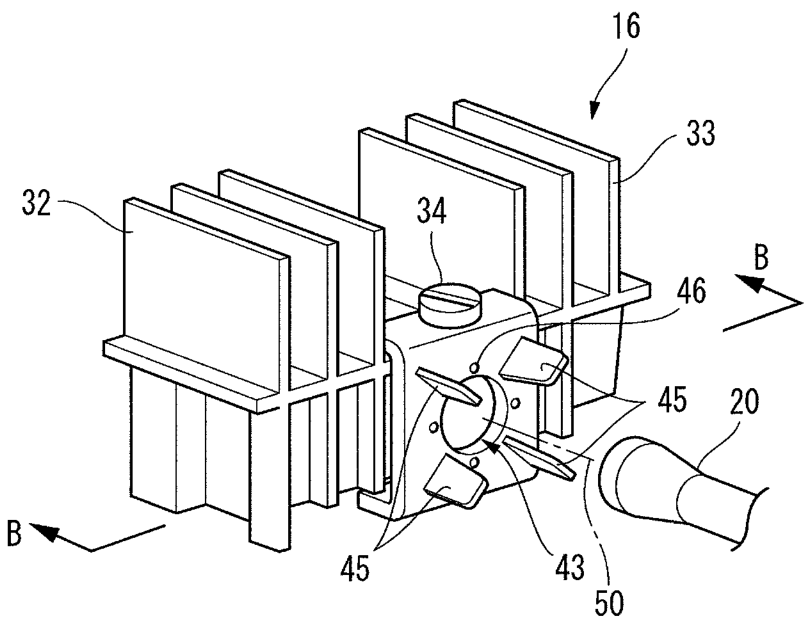
FIG. 4 is a perspective view showing a state that a plated-shaped member of FIG. 3 is fixed to a heat-radiating member.

As shown in FIG. 3, each heat-radiating member 16 is made by aluminum die casting, has a plurality of heat-radiating fins 32 and 33 for heat radiation at an upper portion thereof, and has an attachment recess 36, to which the LED light source 17 formed between a pair of attachment pieces 37 and 37 is attached, at central side portions thereof. Additionally, the LED light source 17 is mounted on a rectangular fixing substrate 15. The fixing substrate 15 is biased toward the attachment recess 36 by a U-shaped leaf spring S. The leaf spring S includes a pressing projection S1 which presses the LED light source 17 against the attachment recess 36 via the fixing substrate 15.

The plate-shaped member 40 is an attachment component with a U-shaped cross-section which is composed of a flat plate portion 41 having a circular through hole 43 at the center thereof in plan view, and an attachment portion 42 having an attachment hole 44. Four attachment ribs 45 arranged in the shape of a cross about a central axis 50 of the through hole 43 at a peripheral edge of the through hole 43 to pinch a tip portion of the light guide 20, and four bosses 46 arranged between adjacent attachment ribs 45 and 45, respectively, are provided on the plate-shaped member 40 so as to protrude therefrom.

In assembling, the fixing substrate 15 is mounted on the attachment recess 36 of the heat-radiating member 16, and is biased by the leaf spring S from above the substrate. Also, the plate-shaped member 40 is mounted on the portion of the attachment recess 36 so that the attachment hole 44 matches a screw hole 35 on the side of the heat-radiating member 16 from above the plate-shaped member, and is tightened with a screw 34, and thereby fixed to the heat-radiating member 16 (refer to FIG. 4).

Figure 5:
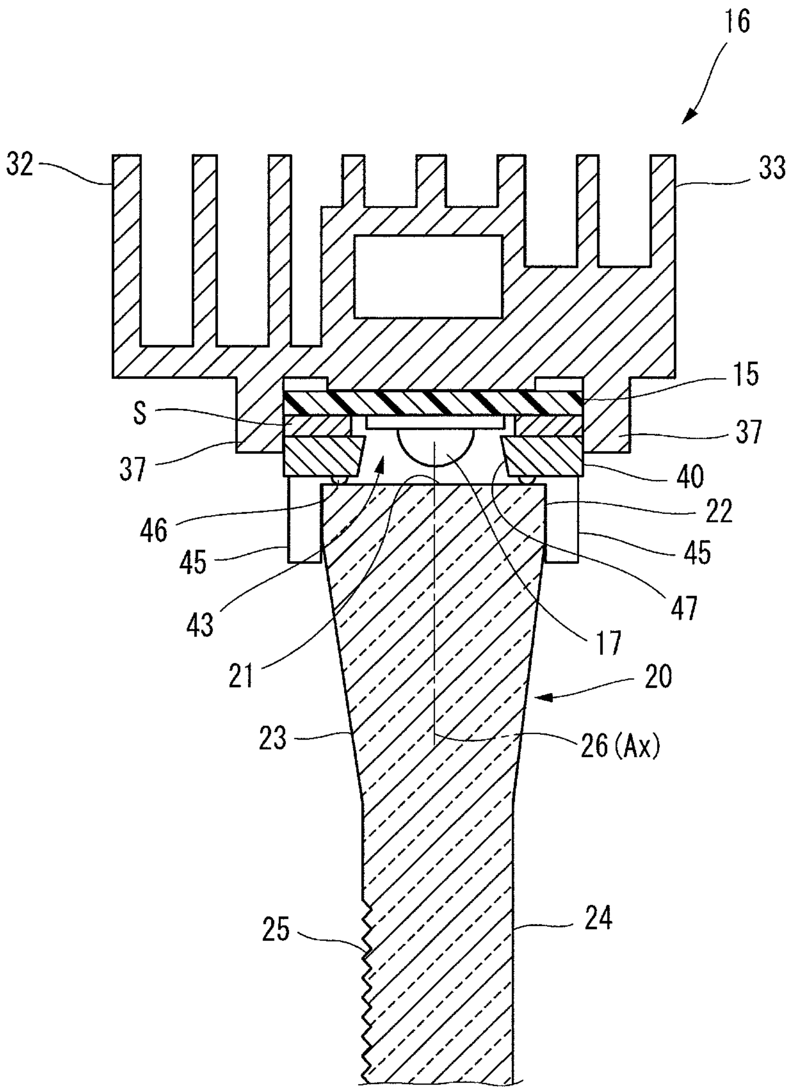
FIG. 5 is a perspective view along B-B line showing a fixing state of a columnar light guide of FIG. 4.

As shown in FIG. 5, the light guide 20 is constituted by a planar incident portion 21 on which the light of the LED light source 17 is incident, a larger-diameter tip portion 22, a smaller-diameter light guide portion 24, and a tapered portion 23 whose diameter gradually decreases from the tip portion 22 toward the light guide portion 24. A triangular diffusing step 25, which internally reflects the light from the LED light source 17 toward the front of the vehicle, is formed in the shape of a belt along the light guide portion 24 on the rear face side passing through an extension axis of the light guide portion 24.

An inner peripheral surface 47 of the through hole 43 of the plate-shaped member 40 is a slope which forms a substantially truncated conical space whose diameter increases from the a columnar curved surface or LED light source 17 side toward the light guide 20. An annular reflecting portion can be formed by forming, for example, an aluminum vapor deposition face on the inner peripheral surface 47.

As the tip portion 22 of the light guide 20 is inserted between the attachment ribs 45 and 45 arranged in the shape of a cross in the vicinity of the peripheral edge of the through hole 43, four spots of the tip portion 22 are pinched by inner peripheral edge portions of the four attachment ribs 45 arranged about the central axis 50 of the annular reflecting portion 47. At this time, the incident portion 21 of the light guide 20 abuts on the bosses 46 provided to protrude between the attachment ribs 45 and 45. Thereby, the optical axis Ax of the LED light source 17 is positioned so as to coincide with a central axis 26 of the incident portion 2 and coincide with the central axis 50 of the annular reflecting portion 47. In addition, the LED light source 17 may be arranged on the central axis 50 of the annular reflecting portion 47. The optical axis Ax of the LED light source 17 and the central axis 26 of the incident portion 21 do not necessarily coincide with the central axis 50 of the annular reflecting portion 47.

Figure 6:
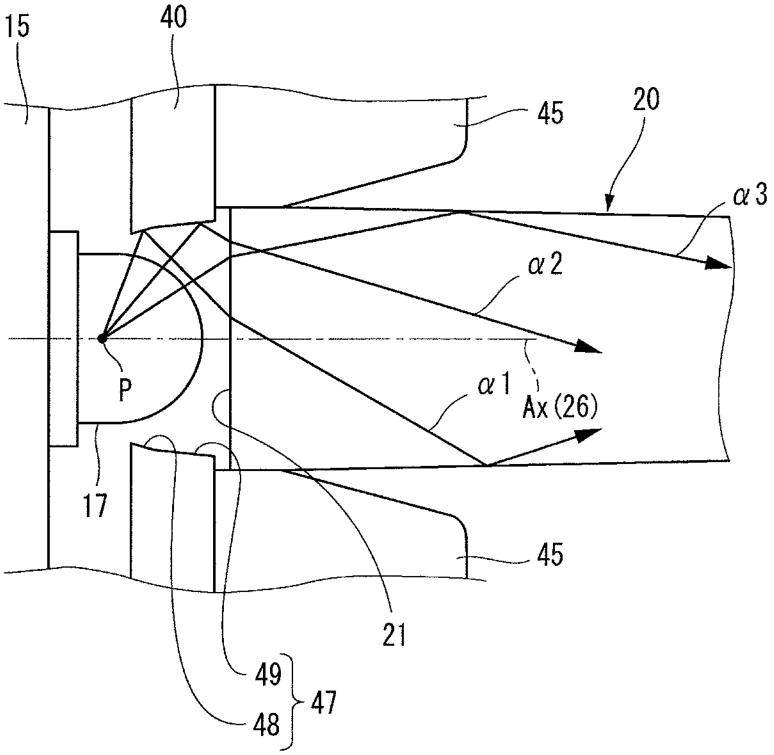
FIG. 6 is an enlarged view of a main part of FIG. 5.

As shown in FIG. 6, the annular reflecting portion 47, which is an inner peripheral surface of the through hole 43 of the plate-shaped member 40, is formed by two discontinuous surfaces including: a first reflecting portion 48, which forms the shape of a truncated conical surface formed on the LED light source 17 side; and a second reflecting portion 49, which is formed on the light guide 20 side, has a larger diameter than the first reflecting portion 48, and forms the shape of a truncated conical surface with a small apex angle. In addition, the annular reflecting portion 47 is not necessarily a discontinuous surface, and can also be a simple columnar curved surface, or a curved surface whose diameter increases as it extends away from an LED light source.

The light $\alpha 1$ with a large emission angle which is emitted from a pseudo light source P of the LED light source 17 and cannot directly enter the incident portion 21 of the light guide 20 is reflected by the first reflecting portion 48, and then enters the vicinity of the central axis 26 of the incident portion 21 so as to avoid reflection to a dome portion of the LED light source 17. Additionally, similarly, the light a2 which cannot directly enter the incident portion 21 and has a smaller emission angle than the light $\alpha 1$ is reflected by the second reflecting portion 49 and enters the vicinity of the outer peripheral side of the incident portion 21. Additionally, the light $\alpha 3$ whose emission angle is yet smaller than the light $\alpha 2$ directly enters the incident portion 21, and then is internally reflected and is guided in an extension direction.

In this way, it is possible to make the light with a large emission angle which has not been able to enter the light guide 20 reliably enter the incident portion 21. Additionally, by providing the first reflecting portion 48 with a truncated conical surface whose apex angle is larger than the second reflecting portion 49, on the LED light source 17 side of the annular reflecting portion 47, the light $\alpha 1$ can be prevented from entering the dome portion of the LED light source 17 after being reflected by the first reflecting portion 48, and the light use efficiency of the LED light source 17 is enhanced.

According to one or more embodiments of the vehicle lamp 10 as described above, there is included the annular reflecting portion 47 which reflects, toward the incident portion 21, the light α1 and light α2 with a large emission angle which are arranged in the vicinity of the LED light source 17 of the incident portion 21, and cannot directly enter the incident portion 21 from the LED light source 17. Thereby, because the light α1 and light α2 with a large emission angle from the LED light source 17 can be reflected by the annular reflecting portion 47, and can be made to enter the light guide 20 from the incident portion 21, the light use efficiency of the LED light source 17 can be improved.

Additionally, the plurality of attachment ribs 45, which fix the light guide 20, are integrally formed along the central axis 50 of the annular reflecting portion 47, around the through hole 43 on the light guide 20 side of the plate-shaped member 40. Thereby, because the light guide 20 can be positioned at a predetermined position of the plate-shaped member 40 having the annular reflecting portion 47, the positioning precision of the incident portion 21 of the light guide 20 can be improved.

Additionally, the annular reflecting portion 47 includes a slope which forms a substantially truncated conical space whose diameter increases toward the light guide 20 from the LED light source 17 side. Additionally, the light guide 20 is formed so that the shape of the incident portion 21 in the front view as seen from a position where the LED light source 17 is arranged is circular, and the external diameter decreases gradually toward the extension direction from the incident portion 21. Thereby, because the external diameter of the incident portion 21 of the end of the light guide 20 can be made large and the incidence area of the light guide 20 can be made large, the light use efficiency of the LED light source 17 can be further improved.

Additionally, because the LED light source 17 and the annular reflecting portion 47 are fixed to the heat-radiating member 16 attached to the lamp body 11, the positional precision of the LED light source 17 can be improved.

Those skilled in the art will appreciate that the material, shape, dimension, numerical value, form, number, arrangement place, and the like of the respective constituent elements of the above-described embodiments may be set arbitrarily so long as the invention can be achieved. While description has been made in connection with specific exemplary embodiments, it will be obvious to those skilled in the art that various changes and modifications may be made therein without departing from the present invention. It is aimed, therefore, to cover in the appended claims all such changes and modifications falling within the true spirit and scope of the present invention.

What is claimed is:

1. A vehicle lamp comprising: within a lamp chamber formed by a lamp body and a front cover, a light source;

a columnar light guide having an incident portion at the end thereof in the vicinity of the light source, wherein the columnar light guide guides incident light from the light source, which enters via the incident portion, and irradiates the incident light from a light-emitting portion on a front side; and an annular reflecting portion arranged in the vicinity of the light source side of the incident portion, wherein the annular reflecting portion reflects light with a large emission angle, which has not been able to directly enter the incident portion from the light source, toward the incident portion, wherein the light source is arranged on a central axis of the annular reflecting portion.

2. The vehicle lamp according to claim 1, wherein the annular reflecting portion is formed on a peripheral surface of a through hole formed in a plate-shaped member, and a plurality of attachment ribs, which fix the columnar light guide, are integrally formed along the central axis of the annular reflecting portion, around the through hole on the columnar light guide side of the plate-shaped member.

3. The vehicle lamp according to claim 1, wherein the annular reflecting portion includes a columnar curved surface or a slope which forms a substantially truncated conical space whose diameter increases toward the columnar light guide from the light source, and the columnar light guide is formed so that the shape of the incident portion in front view as seen from a position where the light source is arranged is circular, and the external diameter decreases gradually toward an extension direction from the incident portion.

4. The vehicle lamp according to claim 1, wherein the light source and the annular reflecting portion are fixed to a heat-radiating member attached to the lamp body.

5. The vehicle lamp according to claim 2, wherein the annular reflecting portion includes a columnar curved surface or a slope which forms a substantially truncated conical space whose diameter increases toward the columnar light guide from the light source, and the columnar light guide is formed so that the shape of the incident portion in front view as seen from a position where the light source is arranged is circular, and the external diameter decreases gradually toward an extension direction from the incident portion.

6. The vehicle lamp according to claim 2, wherein the light source and the annular reflecting portion are fixed to a heat-radiating member attached to the lamp body.

7. The vehicle lamp according to claim 3, wherein the light source and the annular reflecting portion are fixed to a heat-radiating member attached to the lamp body.

8. The vehicle lamp according to claim 1, wherein the light source is an LED light source.

9. The vehicle lamp according to claim 7, wherein the light source is an LED light source.

10. The vehicle lamp according to claim 1 further comprising:

a second light source;

a columnar light guide having a second incident portion at the other end thereof in the vicinity of the second light source, wherein the columnar light guide guides incident light from the second light source, which enters via the second incident portion, and irradiates the incident light from the light-emitting portion on the front side; and a second annular reflecting portion arranged in the vicinity of the second light source side of the second incident portion, wherein the second annular reflecting portion reflects light with a large emission angle, which has not been able to directly enter the second incident portion from the second light source, toward the incident portion, wherein the second light source is arranged on a central axis of the second annular reflecting portion.

11. The vehicle lamp according to claim 10, wherein the second annular reflecting portion is formed on a peripheral surface of a through hole formed in a second plate-shaped member, and a plurality of attachment ribs, which fix the columnar light guide, are integrally formed along the central axis of the second annular reflecting portion, around the through hole on the columnar light guide side of the plate-shaped member.

12. The vehicle lamp according to claim 10, wherein the second annular reflecting portion includes a columnar curved surface or a slope which forms a substantially truncated conical space whose diameter increases toward the columnar light guide from the second light source, and the columnar light guide is formed so that the shape of the second incident portion in front view as seen from a position where the second light source is arranged is circular, and the external diameter decreases gradually toward an extension direction from the second incident portion.

13. The vehicle lamp according to claim 10, wherein the second light source and the second annular reflecting portion are fixed to a second heat-radiating member attached to the lamp body.

14. The vehicle lamp according to claim 11, wherein the second annular reflecting portion includes a columnar curved surface or a slope which forms a substantially truncated conical space whose diameter increases toward the columnar light guide from the second light source, and the columnar light guide is formed so that the shape of the second incident portion in front view as seen from a position where the second light source is arranged is circular, and the external diameter decreases gradually toward an extension direction from the second incident portion.

15. The vehicle lamp according to claim 11, wherein the second light source and the second annular reflecting portion are fixed to a second heat-radiating member attached to the lamp body.

16. The vehicle lamp according to claim 12, wherein the second light source and the second annular reflecting portion are fixed to a second heat-radiating member attached to the lamp body.

17. The vehicle lamp according to claim 10, wherein the light source and the second light source are LED light sources.

18. The vehicle lamp according to claim 16, wherein the light source and the second light source are LED light sources.

* * * * *